United States Patent [19]

Sheets et al.

[11] Patent Number: 4,530,308
[45] Date of Patent: Jul. 23, 1985

[54] LEVEL CONTROL FOR TROUGH FILLING APPARATUS

[75] Inventors: Keith A. Sheets; Devon L. Eby, both of Nappanee, Ind.

[73] Assignee: Chore-Time Equipment, Inc., Milford, Ind.

[21] Appl. No.: 529,846

[22] Filed: Sep. 6, 1983

[51] Int. Cl.³ .......................................... A01K 39/012
[52] U.S. Cl. ................................................... 119/52 B
[58] Field of Search ........................ 119/52 B, 52 AF; 414/300

[56] References Cited

U.S. PATENT DOCUMENTS

| | | | |
|---|---|---|---|
| 3,312,194 | 4/1967 | Ernst | 119/18 X |
| 4,326,482 | 4/1982 | Sauer | 119/52 B |
| 4,337,729 | 7/1982 | Peppler et al. | 119/52 B |

Primary Examiner—Hugh R. Chamblee
Attorney, Agent, or Firm—Trexler, Bushnell & Wolters, Ltd.

[57] ABSTRACT

A feeding system for delivering feed to troughs associated with rows of animal confinement cages is disclosed. The system comprises mobile hopper means for carrying a load of feed past troughs associated with each row of animal confinement cages. Delivery means extend from the hoppers; these delivery systems each receive feed from the hopper and deposit the feed in the feed troughs. The delivery sub-systems include a tube extending from a hopper and hopper conveyor toward a distal tube end at the trough. A shoe is attached to the tube at the distal end so as to support that tube distal end at the location spaced above the trough bottom. A grader blade is pivotally attached to the shoe in such a position as to be located behind the tube when the shoe and tube are moving in a forward direction along the trough.

17 Claims, 10 Drawing Figures

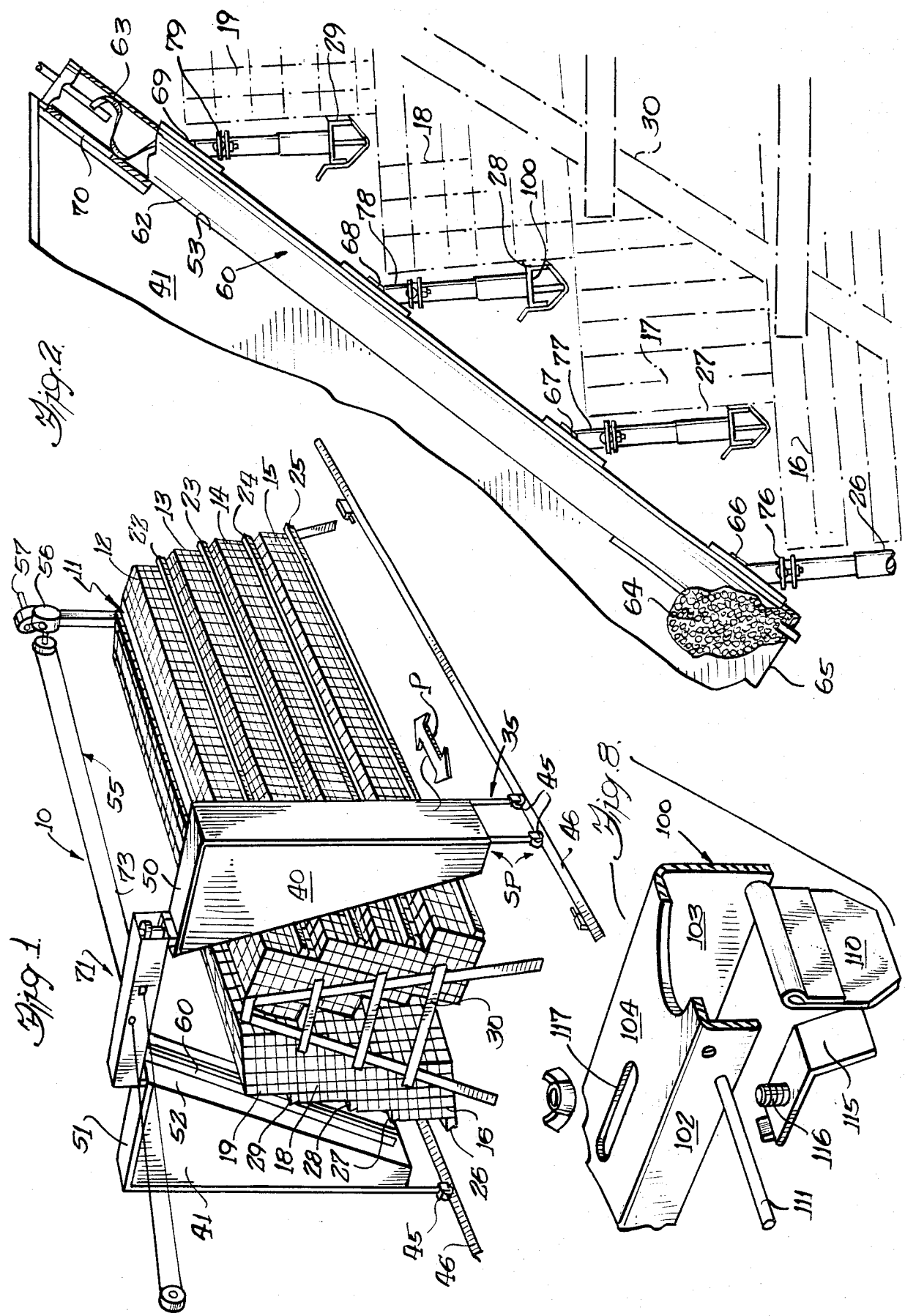

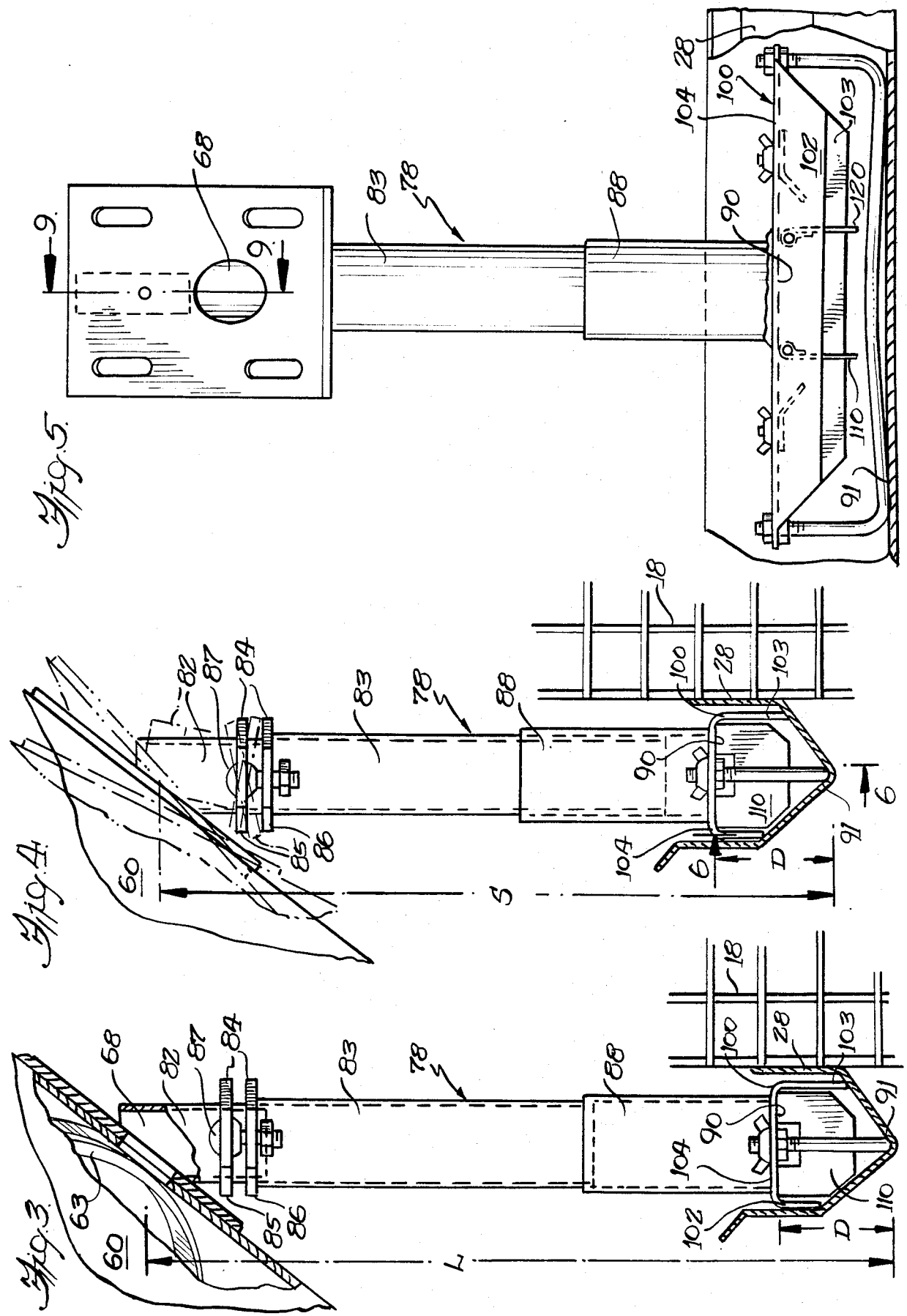

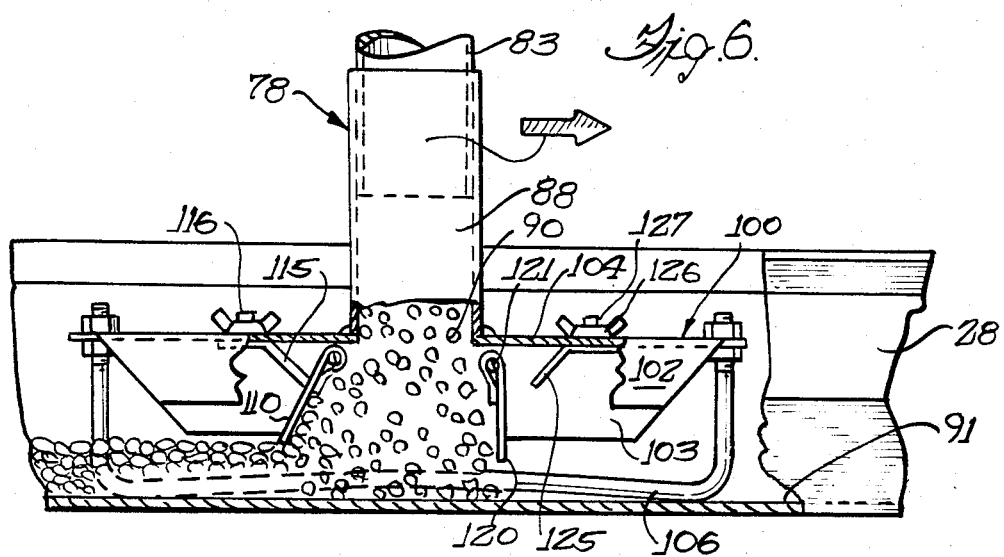
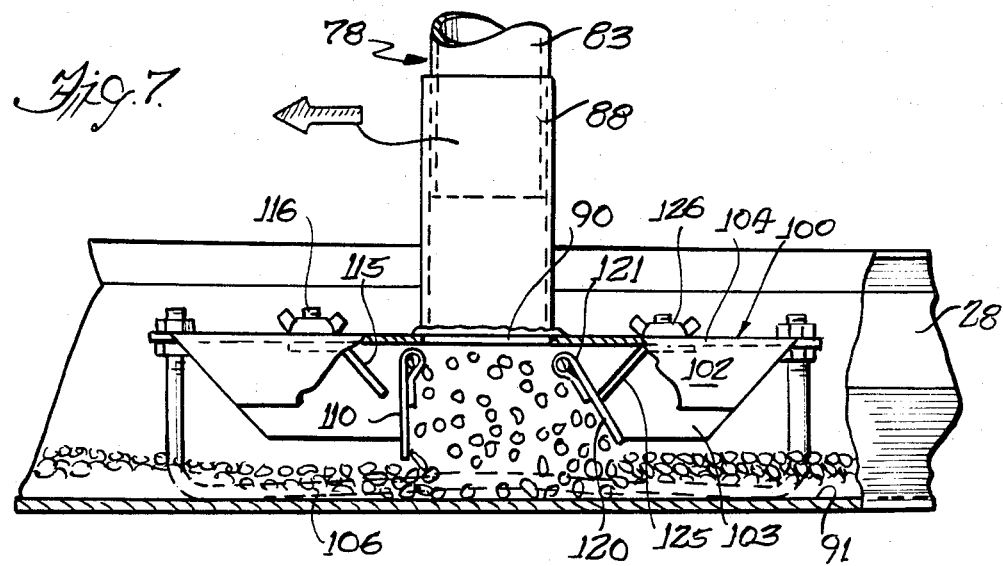
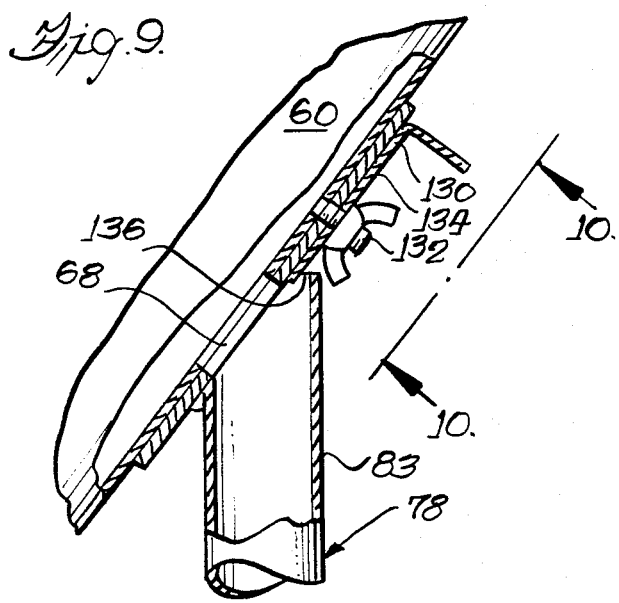
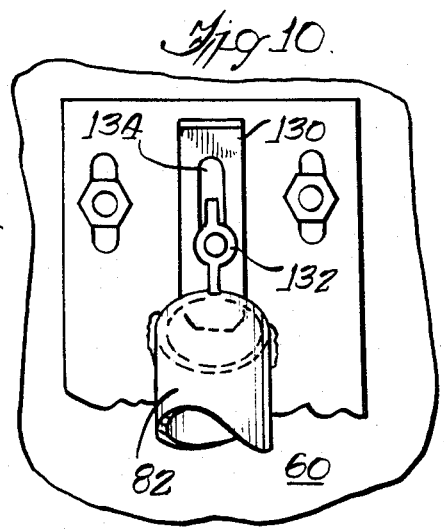

LEVEL CONTROL FOR TROUGH FILLING APPARATUS

BACKGROUND OF THE INVENTION

This invention relates generally to feeding systems for poultry and the like, and more particularly concerns mechanisms for use with a travelling hopper feeding system which will inexpensively and uniformly deliver an accurately quantified feed mix to feed troughs.

In modern poultry operations, sophisticated equipment permits large flocks of poultry to be maintained at high levels of performance with relatively small amounts of hand labor or attention. For example, the production of eggs by layer flocks can be maximized by the use of highly specialized poultry care equipment, and by feeding the layer hens a diet which is carefully controlled as to the amount and nature of feed provided.

An interesting approach to feeding caged hens uses feed-containing hoppers which are moved past stationary poultry cages. Delivery systems dispense measured amounts of feed to troughs adjacent the cages. One such feeding system is described and claimed in U.S. Pat. No. 4,337,729.

A general object of the present invention is to provide a mobile feed delivery system including a feed dispensing or delivery sub-system which extends from hoppers to one or more feed troughs and which is self-adjusting. A related object is to offer such a sub-system which provides an accurately measured and uniform layer of feed in the trough.

More specifically, it is an object to provide a feed delivery system which accurately defines the height and width of a continuous feed pile or bead formed in the trough.

Another object is to provide such a system which operates in an inexpensive and reliable yet effective manner.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a perspective view of a mobile-hopper feed delivery system embodying the present invention;

FIG. 2 is a fragmentary elevational view showing in further detail a feed-containing hopper, the hen-containing cages, and the feed delivery system for delivering feed to the troughs associated with the cages;

FIG. 3 is a fragmentary end elevational view showing the delivery mechanism and an associated feed-receiving trough;

FIG. 4 is a fragmentary end elevational view similar to FIG. 3 but showing the delivery mechanism in an alternate position;

FIG. 5 is a fragmentary side elevational view showing the delivery mechanism, a portion of the trough being broken away for clarity;

FIG. 6 is a fragmentary sectional view taken substantially in the plane of line 6—6 in FIG. 4 and showing in further detail the delivery mechanism as feed is being distributed to the trough;

FIG. 7 is a fragmentary sectional view similar to FIG. 6 but showing the parts as they appear when the feed delivery system is being returned to a feed-delivery-starting point;

FIG. 8 is an exploded view showing in further detail portions of the feed delivery shoe and associated parts;

FIG. 9 is a fragmentary sectional view taken substantially in the plane of line 9—9 in FIG. 5 and showing the upper portions of the feed delivery system; and FIG. 10 is a fragmentary developed view taken substantially in the plane of line 10—10 in FIG. 9.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

THE SYSTEM IN GENERAL

The general appearance of the poultry feeding system 10 is shown in FIG. 1. Poultry cages 11 are arrayed in rows 12–19 inclusive. Associated with each row 12–19 is a feed receptacle; here this receptacle takes the form of unobstructued, continuous, elongated troughs 22–29 extending along the lower front of each corresponding cage row 12–19. The cages (and, indirectly, the troughs) are mounted upon suitable support structure, which here takes the form of an A-frame 30. One form of this cage structure is disclosed and claimed in U.S. Pat. No. 4,060,055.

Mounted for reciprocal or reversible movement over and past this array of cages and troughs is a movable frame 35, which here supports two hoppers 40 and 41. Each hopper 40 and 41 is adapted to contain a relatively large amount of feed. The support structure 35 is provided with wheels 45 which engage rails 46 so that the frame 35, the movably supported hoppers 40 and 41, and other apparatus described below can be easily moved past and over the cages 12–19 and the associated troughs or receptacles 22–29. This hopper motion is caused by a cable system 55 which is powered by an electric motor 56. In order that this motion can occur at prescheduled times, a timer 57 can be associated with the motor 56.

THE HOPPERS

As explained above, the hoppers 40 and 41 are reciprocably carried on each side of the cages 12–19 and troughs 22–29, and are generally triangular in shape, as best seen in FIG. 1. Each hopper is sized to carry a relatively large amount of feed. For example, each hopper can carry enough feed to supply the associated troughs or receptacles 22–25 and 26–29 with, say, a day's feed. Each hopper 40 and 41 is provided with a top cover 50 and 51, respectively, to exclude dirt or other corruption. These hoppers 40 and 41 can be filled manually, or by the automatic operation of a header conveyor operating on a timed cycle, in known manner. The hoppers are located closely adjacent the associated troughs or receptacles 22–29. To this end, each hopper is partially defined by a diagonally oriented wall 52, extending upwardly from the bin bottom point.

THE DISTRIBUTOR CONVEYORS

Feed is delivered to each trough or receptacle 22–29 as the hoppers 40 and 41 are moved along the path P adjacent and over the cages and troughs or receptacles.

To this end, distributor conveyors 60 are mounted on the inclined hopper walls 52 and over the receptacles or troughs 22–29. As shown particularly in FIG. 2, the distributor conveyor 60 includes a tube or housing 62 which carries inside it a screw or auger member 63. This conveyor 60 receives feed from the hopper 41 at a feed access point 64 located at or immediately adjacent the bottom 65 of the hopper 41. In the illustrated embodiment, this feed access point 64 is inexpensively provided by simply forming a hole at the bottom of the diagonal hopper wall 53. By locating this hole 64 at the hopper bottom 65, that feed which has been in the hopper longest first finds its way to the distributor conveyor. It will be understood that the construction and operation of each distributor conveyor is identical.

When the auger member 63 is rotated (by means described below) the feed is drawn upwardly along the distributor conveyor 61 and is routed to flow past feed delivery points 66, 67, 68 and 69 defined in and on the conveyor tube 63. At each feed delivery point 66–69, some of the feed flow can be diverted or dispensed to the underlying troughs or receptacles 26–29 inclusive.

To insure positive feed delivery, and to encourage delivery of a properly uniform mix of feed to and through each of the delivery points 66–69, and thus to the underlying troughs 26–29, an excess of feed is drawn along the distributor conveyor 60 past each delivery point 66–69 as the hopper moves along its path of travel P. The undelivered or excess feed present at the last dispensing point 69 is then drawn further upward to a feed return point or aperture 70 formed in the diagonal hopper wall 52. Here, the excess feed is urged through the return aperture 70 and back into the interior of the hopper 41. In this way, feed mix separation is discouraged, and delivery of the proper amount of each constituent of the feed mix to each caged bird is promoted. Again, it will be understood that the left conveyor operates like the right conveyor 60, and delivers feed to the underlying troughs or receptacles 22–25 in a similar manner.

Operational rotation of the delivery conveyor augers is provided by a drive train 71. This drive train 71 has a sheave (not shown) about which is wound one cable run 73 of the cable drive system 55. As the cable is pulled by the motor 56, the hoppers 40, 41 and frame 35 are moved, and the oppositely traveling cable run 73 turns the sheave. When the hoppers 40, 41 are pulled in a non-delivery direction to return them to the starting point SP shown in FIG. 1, one-way clutches (not shown) disconnect the distributor conveyor augers from the drive train 71 so as to prevent their reverse rotation and consequent damage.

THE FEED DELIVERY TUBES

Feed is delivered to the troughs or receptacles 22–29 from the drop-out points 66–69. To this end, feed delivery tube assemblies 76–79 are provided at each feed dispensing outlet 66–69. In practice, it has been found that delivery of a uniformly deep layer or quantity of feed to each trough is desirable, for the uniform layer provides a uniform ration of feed to all the cage residents.

It has also been found, however, that the feed troughs 22–29 are not always installed in a perfectly straight or level position. Moreover, the tracks 46 upon which the hoppers 40, 41 ride are not always perfectly straight, or perfectly horizontal, or perfectly aligned with the cages and trough receptacles. As a result of these and other variances, the hoppers 40, 41, the distributor conveyors 60, 61, and the associated drop-out holes do not maintain rigidly uniform positions relative to the underlying feed receptacle troughs as the apparatus travels over and past the troughs. Consequently, the delivery assemblies 76–79 offered here are self-adjusting.

To this end, each delivery means 76–79 (such as the delivery tube assembly 78 shown in FIGS. 2 and 3–10) includes a number of tube sections extending from the delivery conveyor 60 and, indirectly, from the hopper 41 for receiving feed from the mobile hopper 41 and for depositing the feed in the feed trough receptacle 28. Here, a first tube section 82 is adapted to receive feed from the distributor conveyor 60 through the drop-out hole 68. Below the tube element 82 is a second tube element 83 which is joined to the first tube element 82 by an articulating joint 84. In the illustrated embodiment, this joint mechanism 84 takes the form of parallel flanges 85 and 86 attached for articulation by extended-head bolts or other fasteners 87. The distal end of the tube element 82 is loosely and telescopically received inside the second tube element 83, so as to permit the second tube element 83 to pivot about the end of the first tube element 82 while receiving feed. In this way, the tube elements can follow horizontal undulations of the feed receptacle bottoms in furtherance of the invention.

To follow undulations of the feed receptacle bottoms in a vertical direction, a third tube element 88 is telescopically connected to the second tube element 83, as most clearly shown in FIGS. 3, 4 and 5. As can be envisioned, when the trough 28 and its bottom 91 are located a relatively large distance L away from the feed delivery point 68, the telescoping action of the tube elements 83 and 88 locate a distal end drop-out aperture 90 at a given distance D above the trough bottom 91. When, however, the trough 28 rises with respect to the distributor conveyor 61 and first tube element 82, this rising action is simply accommodated by a corresponding telescoping action of the tube elements 83 and 88 to provide a smaller distance S as illustrated in FIG. 4. However, the same distance D is maintained between the feed drop-out aperture 90 and the bottom 91 of the trough 28.

In accordance with the invention, a continuous bead of feed is laid down in each trough, and that bead has a well-defined and constant cross-sectional aspect. In this way a closely measured ration of feed is provided to the caged animals. To this end, the delivery tube distal end member 88 is connected to a shoe 100 which rides over the trough bottom 91, as shown especially in FIGS. 3–7. This shoe 100 can be conveniently formed of structural channel steel, and has a cross-sectional shape of squared, inverted, U-shaped aspect. When so formed, the shoe has legs 102, 103 spaced on opposite sides of the tube distal end 88. To encourage the shoe 100 to ride properly in the trough 28, the outer shoe leg 102 is shorter in vertical extent that the inner shoe leg 103.

A top or roof portion 104 joins the legs 102, 103. Together, the elements 102, 103, 104 support the tube distal tube element 88 and aperture 90 at a located spaced above the trough bottom 91. As the tube 88 and shoe 100 move over the trough 28, the legs 102, 103 take part in forming the sides of the feed bead in the trough 28.

As especially shown in FIGS. 6 and 7, this shoe 100 and its legs 102, 103 extend both in front of and behind the tube distal end 90. To provide a smooth, uniform ride over the trough bottom 91, the shoe 100, and its legs 102, 103 extend for a relatively long distance both in front of and the behind the delivery tube distal end 90. Here, the shoe legs 102, 103 extend for a distance of some two times the diameter of the tube distal end portion 88 in a forward direction, and another two diameters in a rearward direction. In addition, a bar guide 106 is attached to the ends of the shoe 100, and is shaped to fit within the bottom 91 of the trough 28.

In accordance with another aspect of the invention, the shoe assembly 100 is adapted to smooth upper portions of the feed bead within the trough 28 to a predetermined vertical depth or level, and to discourage delivery of excessive amounts of feed for use in forming this head. The smoothing action is accomplished as the feed is being delivered and the delivery device is moving in a forward direction, as suggested in FIG. 6. When the movable hopper system and the connected delivery mechanism 78 and shoe 100 are being moved in a retrograde or reverse direction back to the starting point, as suggested in FIG. 7, smoothing action is not necessarily undertaken, and no extensive shoe-feed interengagement or smoothing action occurs. Since the shoe does not rigidly contact the feed, that retrograde motion can be accomplished with relative ease, thereby saving wear and tear on the entire system and conserving drive motor energy.

This one-way smoothing action is accomplished by a trailing grader blade element 110, which is pivotally attached, by a pin 111, to the shoe 100 as especially shown in FIGS. 6–8. This trailing grader blade element 110 is attached to the shoe 100 in such a position as to be located behind the tube means distal end element 88 when the shoe and tube means are moving in a forward, feed-dispensing direction along the troughs as illustrated in FIG. 6. As indicated in FIGS. 3 and 4, the grader element 110 extends substantially across the entire cross-sectional aspect of the shoe 100 so as to form or plane the entire top of the feed bead.

To cause aggressive, positive grading action, a stop member 115 is carried just behind the blade 110. The stop 115 inhibits grader element motion relative to the shoe, and locates the grader element in an active position as illustrated in FIG. 6 when feed delivery and delivery-direction motion are occuring. When the movable hopper mechanism is being returned to a starting point in a reverse direction as illustrated in FIG. 7, the grader element 110 pivots out of the way, and does not aggressively engage the feed.

It has been found helpful to positively prohibit new feed from falling out of the filled tube elements 82, 83 and 88 and from the aperture 90 while the system is being returned to its starting position SP after a one-way delivery run has been made. This is accomplished in the present device by locating the grader blade 110 adjacent the aperture 90. As the unit moves back to its starting point, the grade blade can rotate to at least partly cover the aperture 90, thereby at least partly inhibiting feed fall-out if a large pile of feed is encountered. This pivoting motion provides a feed delivery shut-off action which is positive in its form whenever unused feed is encountered during reverse trough motion.

In carrying out the invention, the range of grader blade 110 motion can be adjusted, so as to adjust the cross-sectional shape of the feed bead and the consequent quantity of feed presented to the caged birds. To this end, the location of the stop member 115 can be adjusted by means of a bolt or other fastener 116 carried in an elongated slot 117 formed in the top of the shoe 100 (FIG. 8). As can be envisioned, the stop 115 can be moved toward or away from the tube distal end 88 in and on the slot 117, and then secured in place. This adjustment will correspondingly adjust the grading position of the blade 110, and the consequent top and vertical depth of the feed bead in the trough.

To avoid delivery of excessive amounts of feed into the shoe 100, a leading or blocking flap element 120 is pivotally mounted by a pin 121 within the shoe 100. This element 120 is located in front of but close to the drop-out aperture 90 and distal element 88. If a pile of feed is encountered as the delivery system 78 and shoe 100 move over the trough 28, the blocking flap element 120 encounters the feed, and is pivoted backward at least partly to cover the drop-out aperture, thereby temporarily restricting the inflow of additional new feed from the distal tube element 88, as can be envisioned from FIG. 6. A stop member 125 is adjustably carried in and on a slot 127 by a fastener 126, in a manner similar to the stop 115, so as to regulate the range of motion of the leading flap element 120.

As shown in FIGS. 9 and 10, the amount of feed entering the drop tube 78 can be adjusted. This is accomplished by a slide gate 130 which is mounted for adjustable interference with the delivery point or hole 68. Here the mounting mechanism takes the form of a bolt 132 which fits through a slot 134 in the slide gate 130. In forming the tube element 83 for attachment to the conveyor 60, a small slot 136 is left to admit the slide gate 130.

The invention is claimed as follows:

1. A feeding system for delivering feed to feed troughs associated with rows of animal confinement cages, each trough having a continuous bottom, the system comprising, in combination, mobile hopper means for carrying a load of feed past the feed troughs, and delivery means extending from the hopper means for receiving feed from the mobile hopper means and for depositing the feed in the feed troughs, the delivery means including tube means extending from the hopper toward a tube distal end at a trough, a shoe having legs spaced on opposite sides of the tube distal end to support the distal end at a location spaced above the trough bottom, and, as the tube and shoe move over the trough, at least partly form a feed bead in the trough bottom, and a grader blade element pivotally attached to the shoe for smoothing upper portions of the feed bead to a predetermined level.

2. A feeding system according to claim 1 wherein said shoe has a cross-sectional shape of inverted U-shaped aspect.

3. A system according to claim 1 wherein said shoe legs extend in front of and behind said tube distal end.

4. A feeding system according to claim 1 wherein said delivery tube means comprises telescopically connected tube elements which permit the tube distal end to follow undulations of the feed trough bottom in a vertical direction.

5. A feeding system according to claim 1 wherein said delivery tube means comprises articulating tube elements which permit the tube distal end to follow undulations of the feed trough bottom in a horizontal direction.

6. A feeding system according to claim 1 wherein said grader blade element is attached to said shoe in such a position as to be located behind the tube means distal end when the shoe and tube means are moving in a forward, feed-dispensing direction along the troughs.

7. A system according to claim 1 further including stop member means carried by said shoe to inhibit grader blade element pivoting motion relative to said shoe.

8. A system according to claim 7 wherein said stop member means is adjustable, for adjusting the range of grader blade element motion.

9. A system according to claim 8 wherein said adjustment means includes an elongated slot formed in said channel member, and means for securing said stop means anywhere toward or away from the tube means distal end on said slot.

10. A feeding system for delivering feed to troughs associated with rows of animal confinement cages, each trough having a continuous bottom, the system comprising, in combination, mobile hopper means for carrying a load of feed past the feed troughs, and delivery means extending from the hopper means for receiving feed from the mobile hopper means and for depositing feed in the feed troughs, the delivery means comprising a tube extending from the hopper toward a distal tube end at a trough, a shoe attached to the tube for supporting the tube distal end at a location spaced above the trough bottom, and a grader blade means pivotally attached to the shoe in such a position as to be located behind the tube means when the shoe and tube means are moving in a forward direction along the troughs.

11. A feeding system according to claim 10 further including a stop member carried by the shoe to inhibit grader blade means movement.

12. A feeding system according to claim 11 further including adjustment means for adjusting the range of grader blade means motion relative to the shoe.

13. A system according to claim 12 wherein said adjustment means includes an engagement member adapted to be affixed to said shoe in any of a range of positions on said shoe, for correspondingly adjusting the range of motion of the grader blade means.

14. A system according to claim 10 further including leading flap means pivotally attached to the shoe in such a position as to be located in front of the tube means when the shoe and tube means are moving in a forward direction along the troughs.

15. A feeding system according to claim 14 further including a stop member carried by the shoe to inhibit flap means movement.

16. A feeding system according to claim 15 including means for adjusting the location of the stop member on the shoe, and the consequent range of flap means motion.

17. A system according to claim 14 wherein said leading flap means is pivotally attached to said shoe in such a position as to permit the flap means to at least partly cover said distal tube end and inhibit additional feed delivery wherever an elevated pile of feed is encountered in the trough during forward direction along the trough.

* * * * *